US008803396B2

(12) United States Patent
Vasilescu

(10) Patent No.: US 8,803,396 B2
(45) Date of Patent: Aug. 12, 2014

(54) ROTOR ASSEMBLY, IN WHICH AT LEAST ONE INTER-CLAW SPACE IS SEALED BY THE FAN

(75) Inventor: Claudiu Vasilescu, Paris (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 1231 days.

(21) Appl. No.: 10/584,406

(22) PCT Filed: Feb. 24, 2005

(86) PCT No.: PCT/FR2005/091465
§ 371 (c)(1),
(2), (4) Date: Oct. 20, 2008

(87) PCT Pub. No.: WO2005/091465
PCT Pub. Date: Sep. 29, 2005

(65) Prior Publication Data
US 2009/0085417 A1 Apr. 2, 2009

(30) Foreign Application Priority Data
Feb. 27, 2004 (FR) ...................................... 04 02030

(51) Int. Cl.
*H02K 1/27* (2006.01)
*H02K 9/06* (2006.01)
(52) U.S. Cl.
USPC .......................... 310/156.66; 310/62; 310/263
(58) Field of Classification Search
USPC .......... 310/62, 263, 60 R, 63, 156.66–156.73

IPC ...................... H02K 9/06,1/22, 9/02, 9/04, 1/24
See application file for complete search history.

(56) References Cited

U.S. PATENT DOCUMENTS

| | | | | |
|---|---|---|---|---|
| 5,325,003 A | * | 6/1994 | Saval et al. ..................... | 310/263 |
| 5,793,143 A | * | 8/1998 | Harris et al. ................... | 310/263 |
| 6,369,486 B1 | * | 4/2002 | Armiroli et al. ............... | 310/263 |
| 6,781,262 B2 | * | 8/2004 | Buening et al. ................ | 310/63 |
| 2003/0030334 A1 | * | 2/2003 | Vasilescu et al. .............. | 310/62 |

FOREIGN PATENT DOCUMENTS

| EP | 0 779 697 A1 | 6/1997 |
|---|---|---|
| EP | 1 122 864 A2 | 8/2001 |
| EP | 1 443 627 A2 | 8/2004 |

* cited by examiner

*Primary Examiner* — Michael Andrews
(74) *Attorney, Agent, or Firm* — Berenato & White, LLC

(57) ABSTRACT

The invention relates to a rotor assembly which is mounted such as to rotate around an axis of rotation (X-X') and which comprises two magnet wheels with claws (10). The aforementioned magnet wheels are separated by an axial space and are disposed opposite one another. Moreover, each wheel (10) comprises an end shield (11) which is essentially perpendicular to the aforementioned axis (X-X'), and claws (12) extended axially from said end shield (11) towards the other wheel (10). The claws (12) of one wheel (10) are solidly connected to the end shield (11) by respective bases (121) which are separated from one another by peripheral spaces (13). The inventive assembly comprises at least one fan (30) which is positioned on an axial face of the end shield (11) of one of the wheels (10) opposite the other wheel (10), such that the fan (30) axially seals at least part of one of the peripheral spaces (13).

8 Claims, 6 Drawing Sheets

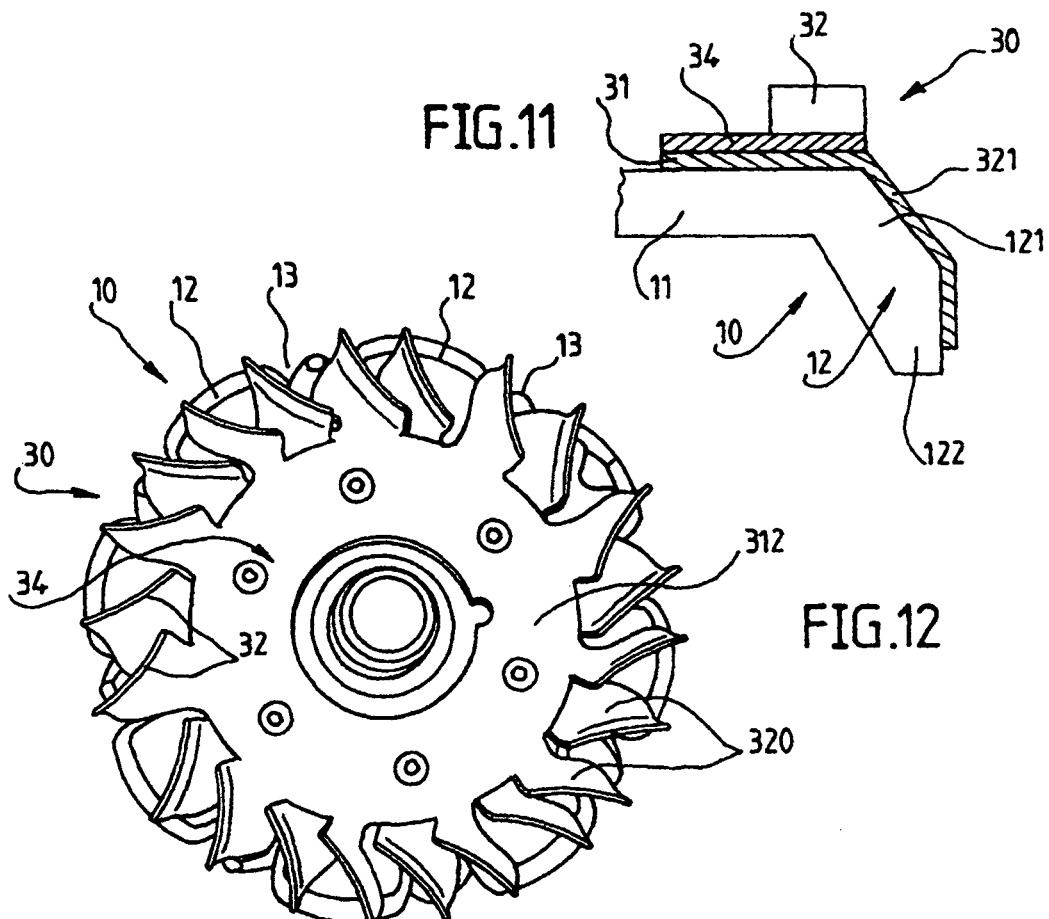
FIG.11
FIG.12
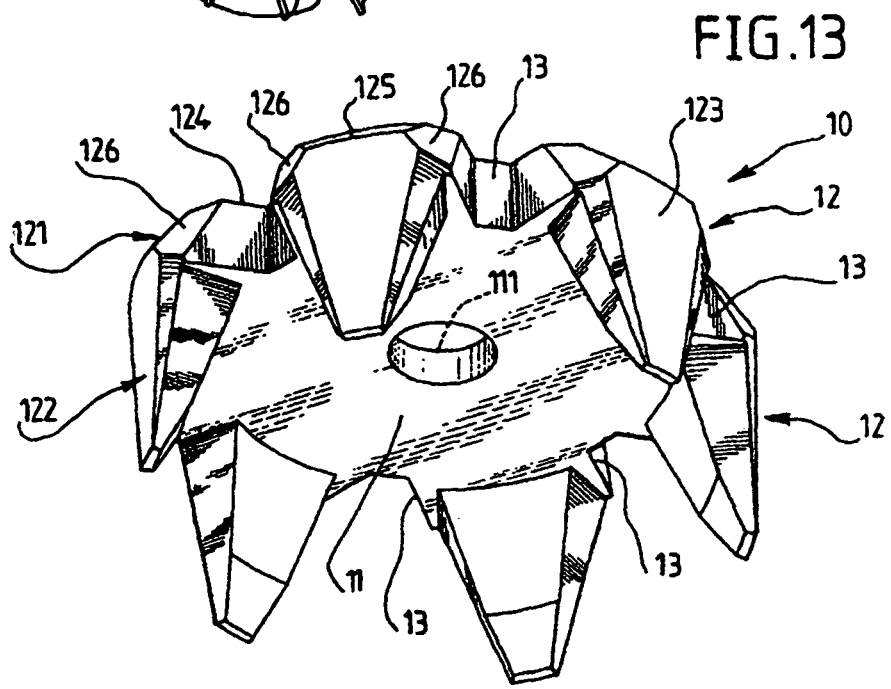
FIG.13

US 8,803,396 B2

ROTOR ASSEMBLY, IN WHICH AT LEAST ONE INTER-CLAW SPACE IS SEALED BY THE FAN

AREA OF THE INVENTION

The invention concerns in general rotating electrical machines in particular automobile vehicle alternators.

More specifically the invention according to a first aspect concerns a rotor assembly in particular for an automobile vehicle alternator, this assembly being mounted rotating about an axis of rotation and comprising two magnet wheels with claws separated by axial spaces and arranged opposite each other, each wheel comprising a end shield approximately perpendicular to the axis and the claws extending axially from the end shield towards the other wheel, the claws of one wheel being attached to the end shield by respective bases mutually separated by peripheral spaces, the assembly comprising at least one fan positioned on the axial face of the end shield of the one wheel opposite the other wheel.

PRIOR ART

Assemblies of this type are known from the prior art, for example document EP A 0 515 259 (U.S. Pat. No. 5,270,605) and are widely used in internally ventilated compact alternators of automobile vehicles.

OBJECTS OF THE INVENTION

One constant objective of research in the field of alternators is to reduce the noise produced by rotation of the rotor assembly.

To this end the rotor assembly of the invention, while complying with the generic definition given in the introduction above, is essentially characterised in that part of this fan axially seals at least partly one of the peripheral spaces.

In a possible embodiment of the invention, the fan comprises a plate approximately perpendicular to the axis and attached to the end shield, and blades projecting from the plate.

Advantageously a sealing section of the plate comes to seal axially at least one of the peripheral spaces.

Preferably said sealing part of the plate carries an axial relief extending from the plate between the claws.

In this case the axial relief can be shaped so as to serve as a fixing clip for the fan on the corresponding magnet wheel.

For example the plate comprises a solid part of approximately annular form.

According to an embodiment of the invention, a zone of the solid part constitutes the sealing part.

Also the claws have radially external faces defining the diameter of the rotor assembly, the solid part having an external diameter equal to or less than the diameter of the rotor assembly.

Alternatively the sealing part of the plate protrudes radially towards the outside from the solid part.

In this case the solid part can have a radially external edge in which is hollowed out at least one recessed zone, the sealing part extending from the base of the recessed zone.

Advantageously said sealing part is inclined axially from the solid part of the plate at the side of the claws.

In this case the fan can comprise a blade extending at least partly over the sealing part.

In a first embodiment the fan is moulded.

In the second embodiment the fan is made of folded metal sheet.

In this second embodiment also a so-called sealing part of the plate comes to seal axially at least one of the peripheral spaces.

According to an embodiment, the plate comprises a solid part of approximately annular form, a zone of this solid part constituting the sealing part.

According to another embodiment, the plate comprises a solid part of approximately annular form, said sealing part of the plate comprising a tab protruding radially towards the outside from the solid part.

In this case the tab can be inclined axially from the solid part at the side of the claws.

According to another embodiment the plate comprises support parts for the blades cut out of the periphery of the plate, one of the support parts constituting the sealing part.

Also the fan can comprise a second plate attached to the plate and supporting the blades, the one plate and the second plate being able to comprise at least one sealing part.

Alternatively the plate and the second plate each comprise at least one sealing part.

In this case the plate and the second plate can comprise respective complementary sealing parts sealing the same peripheral space.

Advantageously the plate is attached to the axial face of the end shield of the magnet wheel, the second plate being positioned on a side of the plate opposite said axial face.

Conversely the second plate can be attached to the axial face of the end shield of the magnet wheel, the plate being positioned on a side of the second plate opposite said axial face.

In all cases the peripheral space may be partly or totally sealed. Similarly all peripheral spaces or just some may be sealed.

In a second aspect, the invention concerns an alternator or alternator-starter of an automobile vehicle comprising a rotor assembly with the characteristics described above.

BRIEF DESCRIPTION OF THE DRAWINGS

Other characteristics and advantages of the invention will become clear from the description below which is provided for information and is in no way limitative, with reference to the attached drawings in which:

FIG. 11 is a partial cross-section view in a radial plane of a magnet wheel on which is positioned a variant of the fan in FIG. 10, FIG. 12 is an axial view of a rotor assembly according to a variant of the second embodiment of the invention, and FIG. 13 is a perspective view of the magnet wheel in FIG. 1.

DESCRIPTION OF EMBODIMENTS OF THE INVENTION

Figures 1, 2:
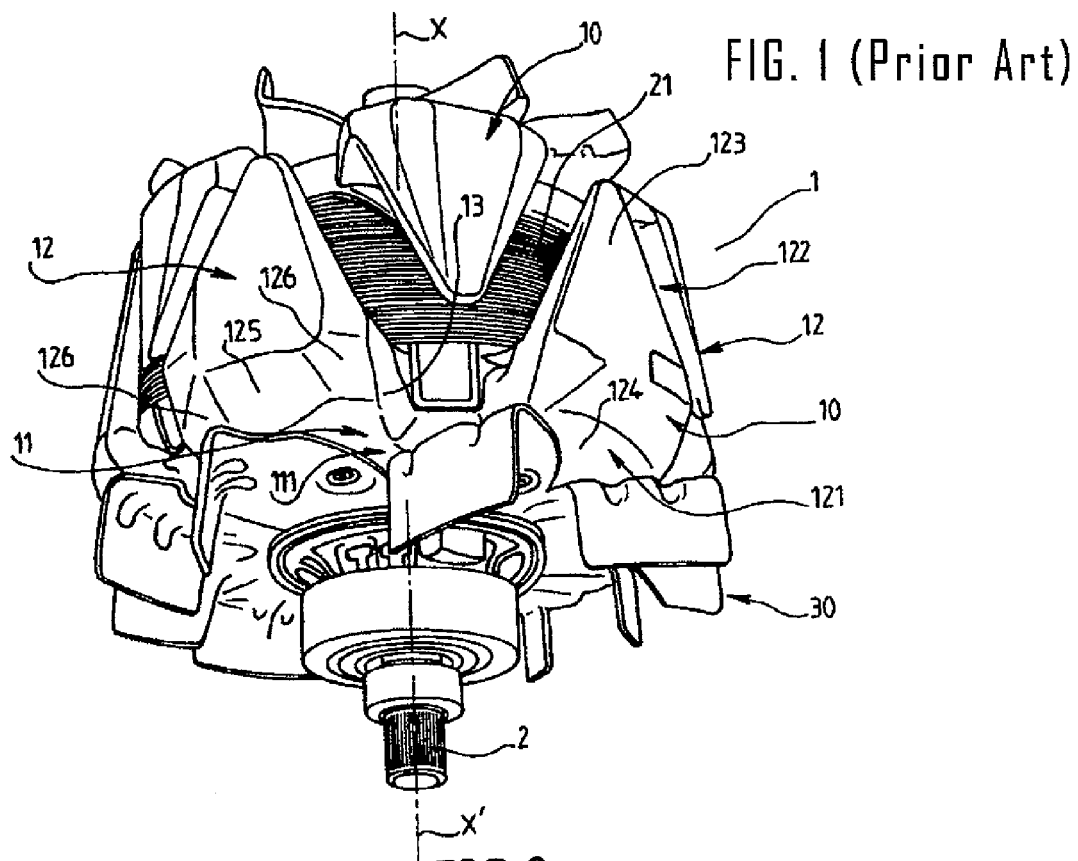
FIG. 1 is a perspective view of a rotor assembly according to the prior art.
FIG. 2 is a perspective view of a fan of a rotor assembly according to a first embodiment of the invention in which the fan is moulded.

FIG. 1 shows a rotor assembly 1 for an automobile vehicle alternator rotating about an axis of rotation X-X'. This assembly is shrunk onto a shaft 2 and firmly attached to this in rotation about axis X-X' by splines carried by this shaft 2, these splines co-operating with grooves arranged in the rotor assembly 1.

The rotor assembly 1 comprises two magnet wheels with claws 10 firmly attached to the shaft 2 and separated by an axial spacing, a hub (not shown) enclosed between the two magnet wheels 10 and an inductive coil 21 wound on the hub.

The magnet wheels 10 each have the general form of a disc centred on axis X-X' and are arranged facing each other. Each wheel 10, as is shown in FIG. 1, comprises a end shield 11 in the form of a disc centred on axis X-X' and approximately perpendicular to this axis, and claws 12 arranged in a circle on the outer periphery of the end shield 11 and spaced regularly along this periphery.

The end shield 11 is pierced by a central bore holding the shaft 2.

The claws 12 are made of the same material of the end shield 11 and extend axially from the end shield 11 towards the other magnet wheel 10. The two wheels 10 bear the same number of claws 12, the claws 12 of one wheel being angularly offset in relation to those of the other wheel such that the claws of the two wheels intermesh, a claw of one magnet wheel becoming axially engaged between two claws of the other magnet wheel.

The claws 12 (FIG. 13) of the same wheel 10 are attached to the end shield 11 by respective bases 121, these bases protruding radially from an outer edge of the end shield 11. The bases 121 are mutually separated by peripheral spaces 13 which, perpendicular to the axis of rotation X-X', have the general form of a ring sector. Following the periphery of the end shield 11, alternately a space 13 is followed by a base 121.

The claws 12 also each comprise a head, also called a tooth, of globally trapezoid form 122, extending the base 121 axially towards the other wheel 10.

The heads 122 have radially outer faces 123 describing a cylinder coaxial to the axis of rotation X-X' and defining the diameter of the rotor assembly 1. These faces 123 viewed in planes perpendicular to the axis of rotation X-X' have respective widths which shrink from the base 121 towards the opposite magnet wheel 10. Here the heads 122 have a form similar to that described in document EP 0 515 259 to which reference is made for further details. The heads therefore have peripheral chamfers and anti-noise chamfers 126 described below.

The rotor assembly 1 comprises at least one fan 30 attached to an axial face 111 of the end shield 11 of one of the wheels 10, said face being turned in a direction opposite to the other wheel 10.

The base 121 (FIG. 13) is delimited from the side of the axial face 111 by a straight facet 124 extending in the same plane as said axial face, an oblique facet 125 linking the straight facet 124 to the outer face 123 of the head 122, and two chamfers 126 laterally framing the oblique facet 125 and thus linking the straight facet 124 to the outer face 123. The oblique facet 125 and the chamfers 126 are inclined axially towards the opposite magnet wheel 10 from the straight facet 124. The chamfers 126 are slightly inclined laterally towards the adjacent claws 12.

A rotor assembly 1 for an automobile vehicle alternator according to the present invention is substantially similar to the rotor assembly of the prior art depicted in FIG. 1, and only the fan 30, which differ, will therefore be explained in detail below. To simplify the description, all elements of the rotor assembly 1 according to the present invention similar to those of the rotor assembly of the prior art depicted in FIG. 1, are designated by the same reference numerals.

According to the invention, part of this fan 30 seals at least partially one of the peripheral spaces 13 in an axial direction i.e. parallel to the axis of rotation X-X'.

Here the term seal means that said fan part comes to close the peripheral space 13 on an axial side opposite the other wheel 10. Said fan part thus extends between the two bases 121 framing the peripheral space 13, from the one to the other.

It is positioned against the straight facets 124 of these bases or at least extends to the immediate proximity of the straight facets such that the space between said fan part and the bases is very small in relation to the dimensions of the peripheral space 13. Also said fan part extends over the majority of the radial height of the peripheral space 13.

The fan 30 comprises a plate 31 approximately perpendicular to axis of rotation X-X' and attached to the end shield 11, and blades 32 protruding from the plate 31 in the direction opposite the wheel 10. The fixing to the end shield is achieved for example by riveting and/or gluing.

In a first embodiment corresponding to FIGS. 2 to 9, the fan 30 is moulded. It is typically made of plastics material but can also be made of other materials.

Figure 3:
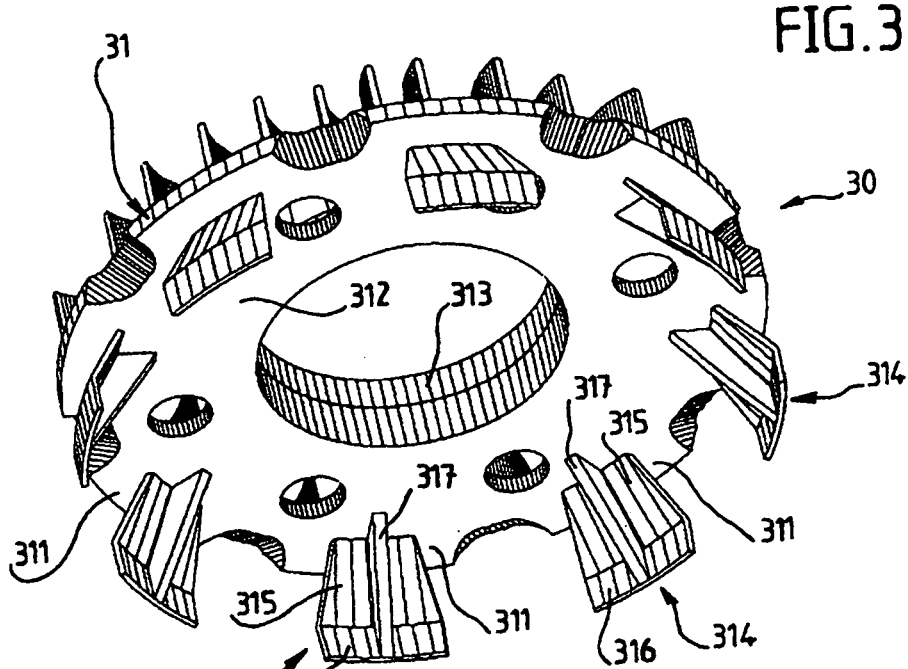
FIG. 3 is a perspective view along arrow III in FIG. 2.

As will be seen on FIGS. 2 and 3, the so-called sealing parts 311 of the plate 31 come to seal axially the peripheral spaces 13.

Naturally it is possible that the sealing parts 311 of the plate 31 do not seal all the peripheral spaces 13 but only some of them.

Figure 4:
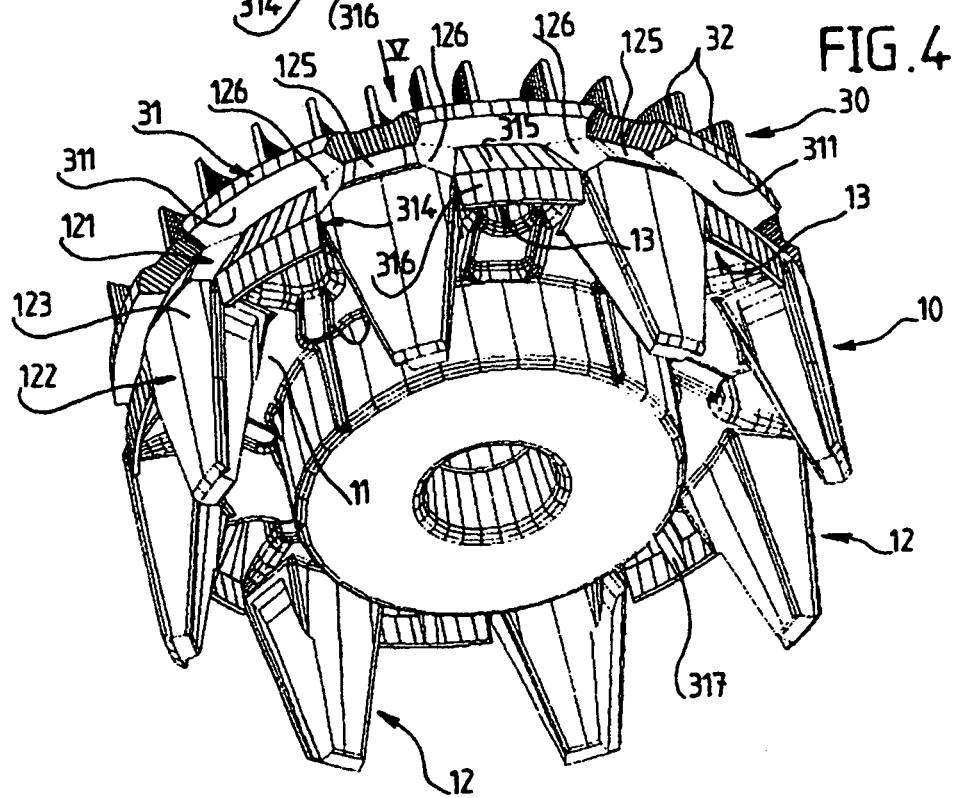
FIG. 4 is a perspective view of the fan in FIGS. 2 and 3 mounted on a magnet wheel of the rotor assembly.
Figure 5:
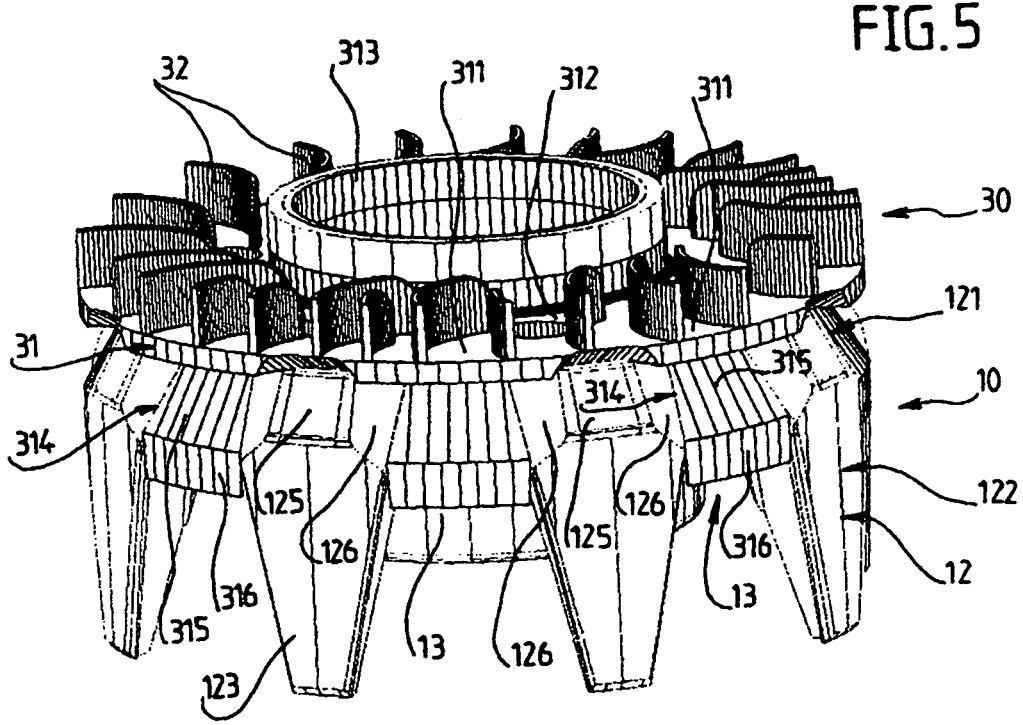
FIG. 5 is a perspective view along arrow V in FIG. 4, FIGS. 6 to 9 are views equivalent to FIGS. 2 to 5 for a rotor assembly according to a variant of the first embodiment.
Figure 6:
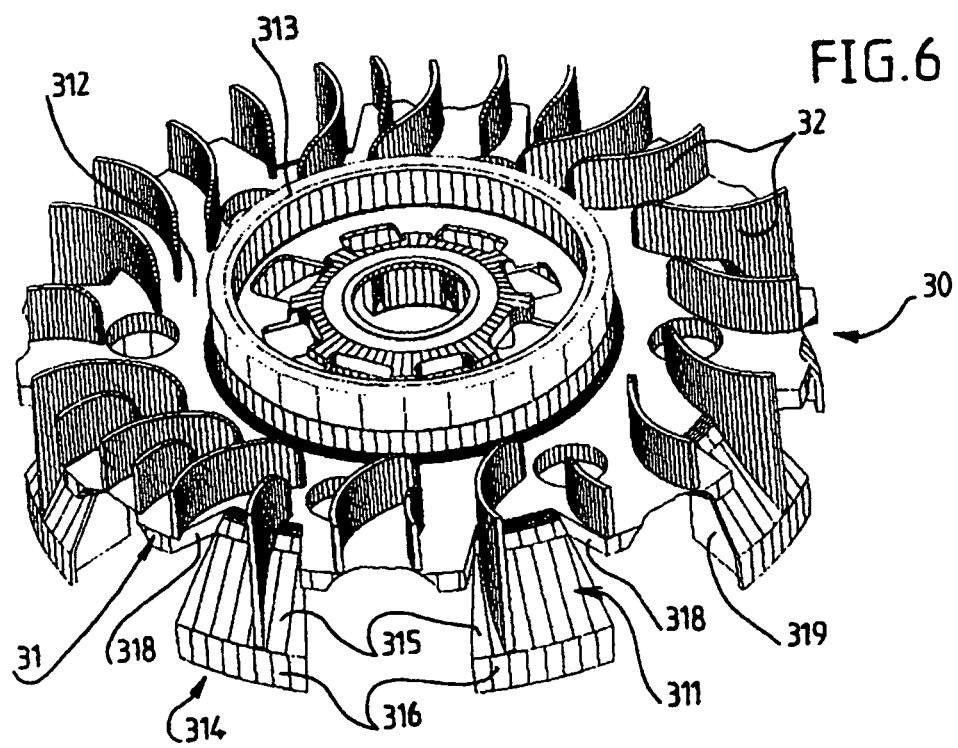
Figure 7:
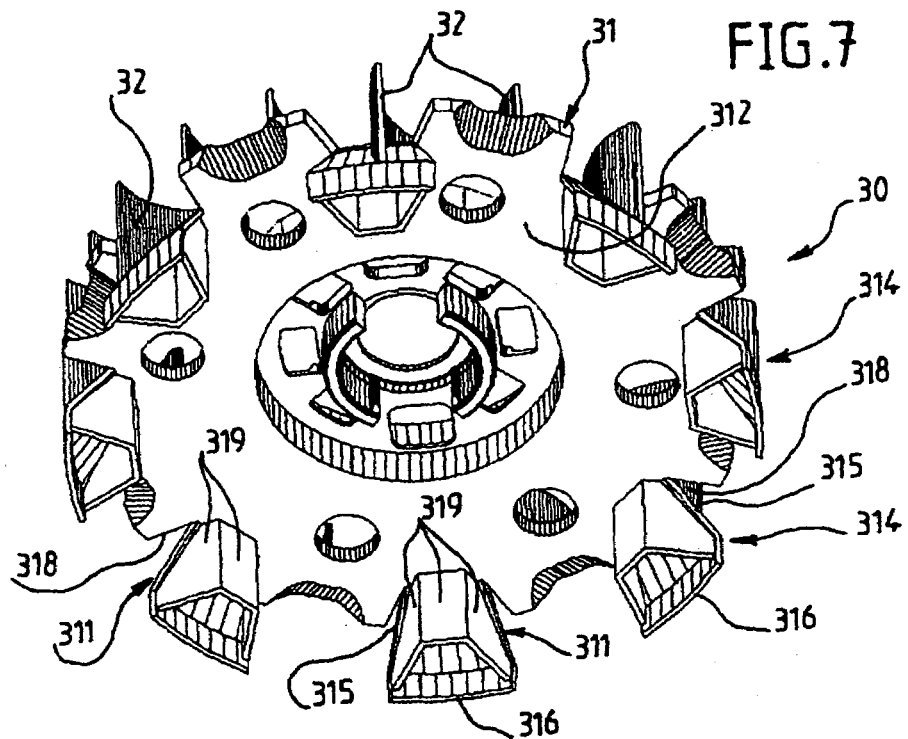
Figure 8:
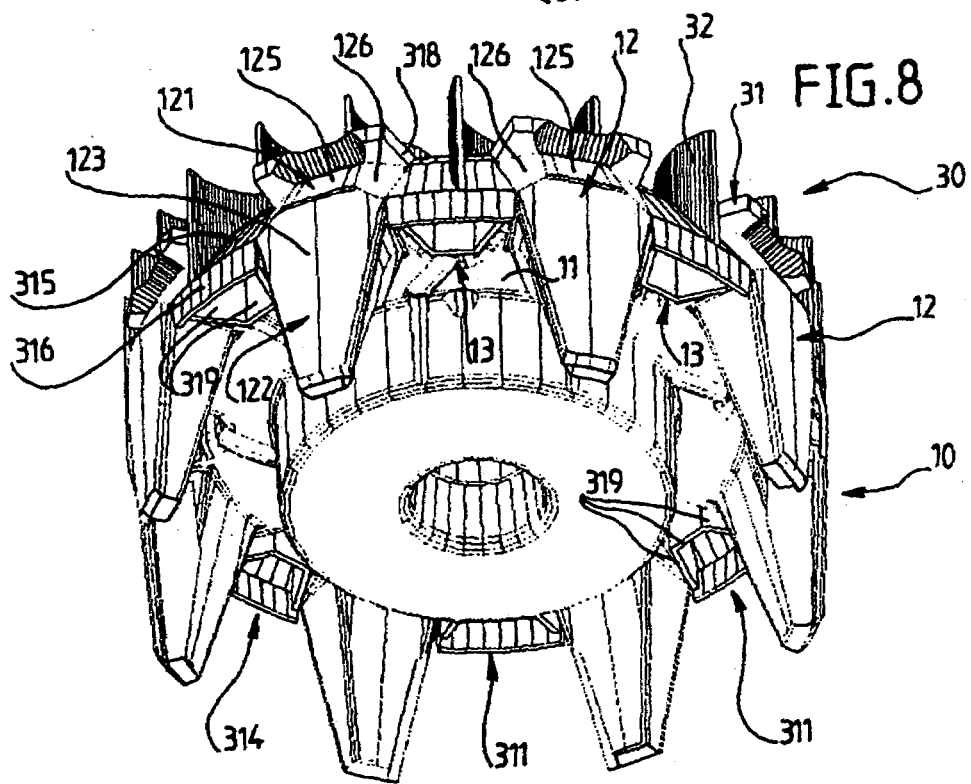

As will be seen on FIGS. 2 and 3, the plate 31 comprises a solid part 312 of approximately annular form, and an edge 313 of axial orientation standing on a radially inner edge of the solid part. The edge 313 of annular form delimits a central opening. FIG. 4 shows that the solid part 312 has an outer diameter equal to or less than the diameter of the rotor assembly. The radially outer edge of the solid part 312, following a radial direction, reaches the level of the oblique facets 125.

The blades 32 project axially on a face of the plate 31 opposite the end shield 11. In the embodiments in FIGS. 2 to 9, these blades have an elongated form following a longitudinally curved direction running generally from the inside towards the outside of the fan. These blades 32 have an outer longitudinal end stopping on the radially outer edge of the solid part 312.

The sealing parts 311 are formed by zones of this solid part 312, the zones being regularly spaced along the outer edge of the solid part and lying axially in the extension of the peripheral spaces 13.

Nothing separates the sealing parts 311 from the rest of the solid part 312.

In a particularly advantageous manner the sealing parts 311 each bear an axial relief 314 extending from the plate 31 between the claws 12.

On FIG. 3 it can be seen that these reliefs 314 each have the form of a thin tab firmly attached to a face of the plate 31 turned towards the end shield 11 and extending from a point on this face situated radially remote from the outer edge of the solid part 312.

The tab comprises a first face 315 extending obliquely from the solid part 312 axially and radially towards the outside so that a proximal end of the first face 315. which is attached to the plate 31 is radially spaced from the radially outer edge of the plate 31, and a second face 316 extending from a distal end of the first face parallel to the axis of rotation X-X'.

The first face 315 has a slight concave curvature turned towards the axis of rotation X-X' and seals the space between the chamfers 126 of the two claws 12 framing the peripheral space in which is engaged the tab.

The second face 316 lies in the extension of the outer faces 123 of the two claws and here partially seals the space separating these two outer faces over a short axial length.

Each relief 314 carries an axial reinforcing rib 317 extending from the plate 31 along and first and second faces 315 and 316. As best shown in FIG. 3, the reinforcing rib 317 is centrally located relative to the first and second faces 315 and 316. The faces extend axially in the direction opposite the blades 32.

Naturally it is possible to ensure that only certain sealing parts carry axial reliefs.

It is noted that the first face 315 of reliefs 314 expands from the plate 31 up to the second face. Viewed peripherally to axis X-X', the first face has a width which is relatively smaller close to the solid part 312 and relatively larger at the junction with the second face 316. Therefore the axial reliefs 314 can serve as fixing clips for the fan 30 on the corresponding magnet wheel 10.

In an embodiment shown on FIGS. 6 to 9, the sealing parts 311 comprise axial reliefs 314 which then have the double function namely of sealing and as a fixing clip.

In these cases zones 318 of the solid part 312 situated axially in the extension of axial reliefs 314 are recessed. These zones would constitute the sealing parts 311 on FIGS. 2 to 5. These recessed zones 318 are hollowed from the outer edge of the solid part 312 and each have a general U-shape. They are delimited by a base and two lateral sides diverging from the base up to the outer edge of the solid part 312.

The first face 315 of the axial reliefs 314 thus each extend from the base of a recessed zone 318 and are inclined from the base towards the outside and towards the claws 12.

Advantageously an extended blade 32 can be provided extending along the first face 315 of each axial relief 314. A longitudinal, radially inner extremity of this blade is situated on the solid part 312. The longitudinal opposite extremity of the extended blade is located at the junction between the first and second faces 315 and 316.

Thus a centrifugal type fan as shown on FIGS. 2 and 3 can be transformed into a helical centrifugal fan. A centrifugal fan draws the air parallel to its axis of rotation and expels the air perpendicular to this axis. A helical centrifugal fan draws in the air parallel to its axis of rotation and expels the air in a direction inclined in relation to this axis, the angle in incline being greater than zero and less than 90°.

It is noted that in this variant embodiment, the reinforcement rib of FIG. 3 replaced by three webs 319 forming a reinforcement box for the axial relief 314.

A central web 319 extends parallel to the axis of rotation X-X' from the base of the recessed zone 318. Two lateral webs 319 link the opposite lateral edges of the central web 319, turned towards the two claws framing the axial relief 314, to the lateral edges of the first and second faces, themselves turned towards the two claws.

The central web is relatively narrower than the first and second faces 315 and 316 such that the lateral webs diverge from the central web to the first and second faces. Viewed in cross-section perpendicular to the axis of rotation X-X', the reinforcement box therefore has trapezoidal sections, the central web of which constitutes the small base. The lateral webs allow matching of the form of the chamfers 126 of the claws and as a variant are extended for this purpose.

In a variant embodiment not shown, the plate 31 comprises a solid part 312 of approximately annular form, the sealing parts 311 protruding radially towards the outside in relation to the solid part 312.

In this case the solid part 312 has an outer diameter smaller than on FIGS. 2 to 9 corresponding approximately to the diameter of the end shield 11.

Figure 10:
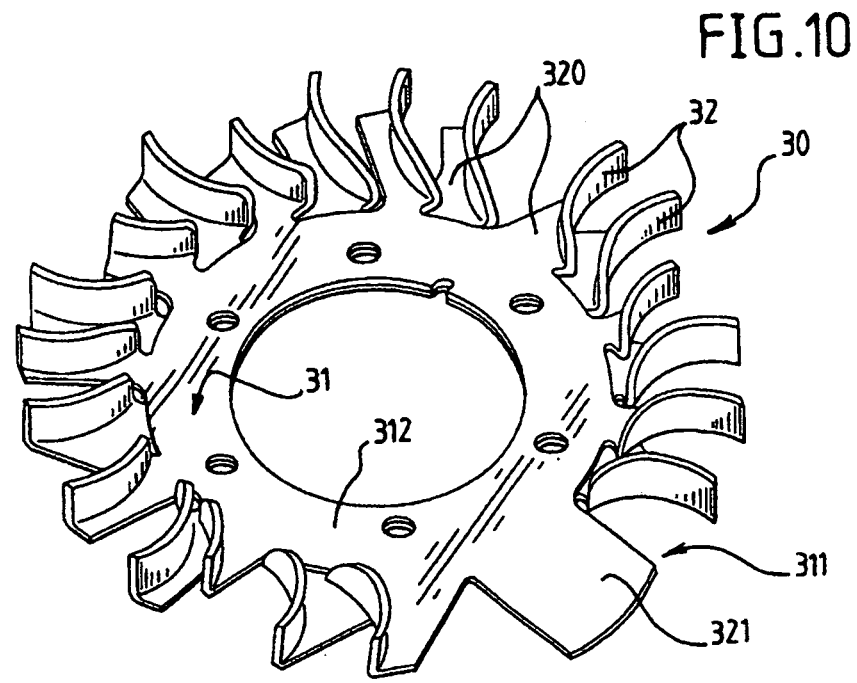
FIG. 10 is a perspective view of a fan of a rotor assembly according to a second embodiment of the invention in which the fan is made of folded sheet metal.

In a second embodiment corresponding to FIGS. 10 to 12, the fan 30 is made of folded sheet metal. It can therefore be fixed by welding to the end shield 11. As a variant the fixing is achieved by riveting.

As before, plate 31 of this fan comprises a solid annular part 312 and blade support parts 320 cut out of the periphery of this plate.

These support parts 320 extend towards the outside from a peripheral outer edge of the solid part 312. They each have a generally triangular form, one of the sides of which constitutes a common edge with the solid part 312 and one of the summits of which points in the radially outer direction. The blade 32 extends along a side of the triangle approximately between said summit pointing towards the outside and the outer edge of the solid part 312.

As in the first embodiment, a zone of this solid part 312 can constitute the sealing part 311.

In the example embodiment shown on FIGS. 10 and 12, the sealing part 311 comprises a tab 321 protruding radially towards the outside from the solid part 312.

This tab 321 may, as shown in FIG. 10, extend in the same plane perpendicular to the axis of rotation X-X' as the solid part 312.

It can have multiple forms: rectangular, oval, oblong etc. It can seal the peripheral space 13 fully or partly.

The tab 321 can also be inclined axially from the solid part 312 at the side of the claws 12 as shown on FIG. 11. In this case it can have two faces like the axial relief 314 of the first embodiment: an oblique face of one piece with the solid part 312 and coming to seal the space between the chamfers 126 of the two claws 12 between which is engaged the tab 321, and an axial face extending the oblique face and coming to seal the space between the outer faces 123 of the claws 12.

The tab also may comprise only the oblique face.

In a variant embodiment shown on FIG. 12, the sealing part 311 can comprise a support part 320 arranged axially in the extension of the peripheral space 13.

The fan 30 can comprise one, two or more than two sealing parts 311.

These sealing parts 311 may all be of the same type i.e. all comprising a zone of the solid part 312, or all comprising a tab 321 or all comprising a blade support part 320. But a single fan can also comprise several support parts 311 of different types without limitation of the possible combinations.

The fan 30 can comprise a second plate 34 (FIG. 12) perpendicular to the axis of rotation X-X', of the same type as the plate 31 and also bearing blades 32.

The second plate 34 is positioned on the axial face 111 of the end shield 11 of the magnet wheel 10, the plate 31 being attached on one side of the second plate 34 opposite said axial face 111. Each plate can be fixed to the end shield 11 for example by welding, the most distant plate having passages for welding the closest plate to the end shield 11 and vice versa.

The solid parts 312 of the two plates are advantageously of the same diameter. The blade support parts 320 of the second plate 34 are angularly offset in relation to the blade support parts of the plate 31 such that the blades 32 of the second plate 34 intermesh between the blades of the plate 31.

Alternatively the plate 31 can be positioned on the axial face 111 of end shield 11 of the magnet wheel 10, the second plate 32 being attached on one side of the plate 31 opposite said axial face 111.

At least one on the plate 31 and second plate 34 comprises one or more sealing parts 311. These parts can be of any type.

It is possible that the plate 31 and the second plate 34 each comprise one or more sealing parts 311.

In this case the same peripheral space 13 can be sealed with two complementary sealing parts, the one carried by the plate and the other by the second plate.

It will be clearly evident that the rotor assembly described above presents multiple advantages.

To seal one or more of the peripheral spaces 13 allows a reduction of the harmonics created by the magnet wheels and a reduction in the acoustic interaction between the rotor assembly and the stator cooperating with this assembly.

This is particularly important because the most recent fans are extremely quiet. They generate very little noise which no longer covers the harmonics created by the magnet wheels.

It is known that the peripheral spaces separating the claws of one magnet wheel are zones where during rotation great turbulence is created, with fluid detachment from the solid surface and hence significant pressure differences, which leads to the creation of aerodynamic noise and hence harmonics. The sealing of these spaces achieves a significant reduction in this turbulence and in noise due to rotation of the machine.

This seal is achieved in a particularly convenient and economic manner as no part is added to the rotor assembly. Elements already existing in this assembly are used, cut or shaped differently to seal the peripheral spaces.

It is possible to achieve the seal in an asymmetrical fashion on the same magnet wheel i.e. to seal only certain peripheral spaces distributed irregularly or seal the peripheral spaces each in a different manner.

Advantageously the harmonic signals are thus distributed over a wider range.

Also it is evident from the description above that an in-depth seal can be obtained between the claws which increases the efficacy of the reduction of harmonics.

Finally it is possible to omit the chamfers 126 because of the presence of these sealing parts 311. These chamfers have the same function as the sealing parts, namely to reduce the noise produced by the magnet wheels in rotation. They are costly to machine and can affect the electromagnetic performance of the rotor by diminishing the passage of electromagnetic flux in the claw. In this case the oblique facet 124 is simply extended transversely on both sides.

Although we have described a rotor assembly fitted with a single fan, this assembly can be fitted with two fans without leaving the scope of the invention. The two fans are fixed to the two opposite magnet wheels and allow sealing of the peripheral spaces of the two wheels.

As will be evident, the axial reliefs 314 constitute a profiled tab so as to adapt to the inter-claw spaces.

The tabs 321, 314 allow at least partial sealing of the spaces between the claws in a more effective manner than the embodiment in FIG. 12. In fact the shape of the tabs 321 and 314 is not limited by the shape of the blades and the function of the blades, in particular when these are made of sheet metal.

It will be evident that the rotor according to the invention is advantageously intended to be mounted in an internal fan alternator as described for example in document EP-A 0515 259. Such an alternator comprises a stator surrounding a claw rotor.

The rotor is firmly attached to the shaft 2 mounted centrally in rotation via ball bearings, one of which is visible in FIG. 1, in a housing with two parts called a front bearing shell and rear bearing shell. The bearing shells are hollow and each has a base fitted with openings to form air inlets and a peripheral edge also fitted with openings to form air outlets. The base of the bearing shells are globally oriented transversely and centrally carry a ball bearing for rotational mounting of the rotor support shaft. The bases are each extended at their outer periphery by the peripheral edge of globally axial orientation and with a shoulder for mounting the body of the stator carrying the coil with a plurality of phase windings, the caps of which extend protruding axially on either side of the stator body below the openings of the peripheral edges of the bearing shells when assembled for example with screws or stud bolts, to form the housing for the stator and rotor. The rotor carries at least on one of its axial ends a fan mounted radially below the cap concerned. The rear bearing shell carries at least one brush carrier while a pulley attached to the rotor support shaft is adjacent to the front bearing shell. For the other constituents of the alternator, reference is made to the document cited above. A rectifier bridge for example with diodes is linked to the phase windings. As a variant this rectifier bridge is shaped to form an inverter as described for example in document FR-A-2 745 444 to inject current into the phase windings of the stator to cause the alternator to function as an electric motor in particular to start the combustion engine of the automobile vehicle, such an alternator being called an alternator-starter.

In all cases when the rotor support shaft turns, the fan or fans allow creation of an air current between the air inlet and outlet openings passing through the caps of the stator winding.

Naturally the present invention is not limited to the embodiments described.

Figure 9:
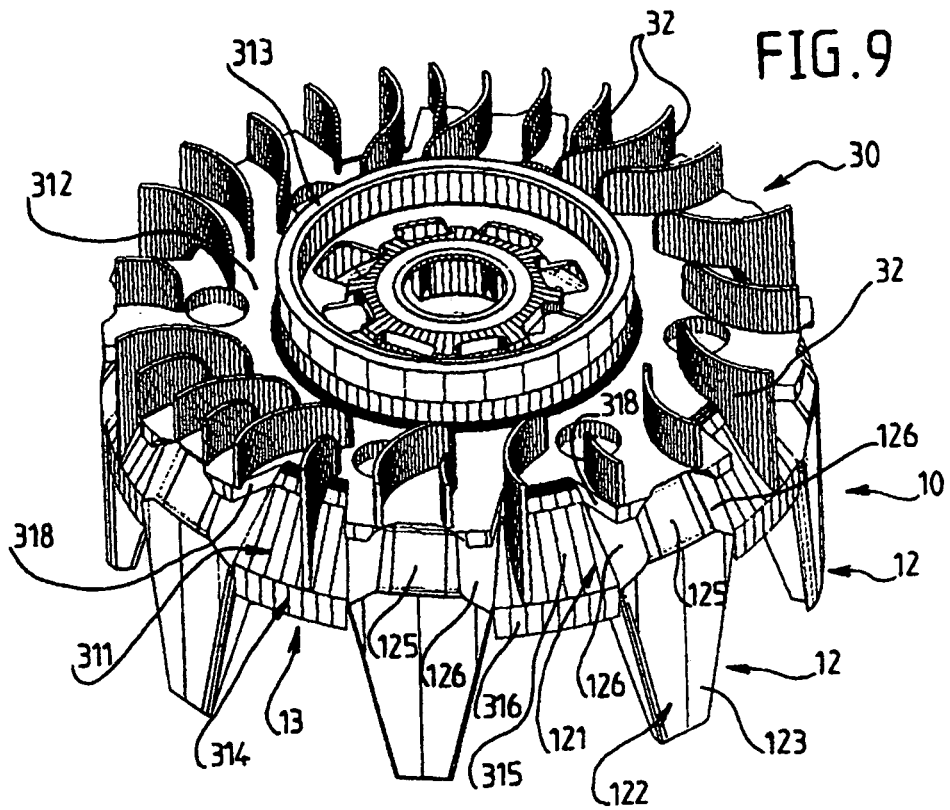

Thus the annular edge 313 in the form of a crown in FIG. 9 can comprise a magnetic target which in association with at least one sensor ensures magnetic monitoring of the rotation of the rotor as described in document FR A 2 857 171, to which reference is made for further details, the alternator in this case being an alternator-starter.

More precisely the target can comprise a plasto-magnet in the form of a crown which is moulded onto the end shield of the fan as in FIGS. 2A and 2B of the said document.

The holes, not referenced, which are seen in FIG. 9 can then serve for removal from the mould.

Thanks to the target and the sensor, at the correct moment electric current can be injected into the phase winding concerned of the stator winding as described for example in documents FR-A-2 745 444, EP A 0 260 176 and WO 01/69762.

All combinations are possible.

The invention claimed is:

1. A rotor assembly mounted to rotate around an axis of rotation (X-X') and comprising:
  two magnet wheels (10) separated by an axial spacing and arranged opposite each other, each of the wheels (10) comprising an end shield (11) substantially perpendicular to the axis (X-X') and claws (12) extending axially from the end shield (11) towards the other wheel (10);
  the end shield (11) of one of the magnet wheels comprising an axial face (111) opposite the other wheel;
  the claws (12) of one wheel (10) being attached to the end shield (11) by respective bases (121) mutually separated by peripheral spaces (13); and
  a fan (30) positioned on the axial face (111) of the end shield (11) of one of the wheels (10) opposite the other wheel (10) so as to axially seal at least partly one of the peripheral spaces (13);

the fan (30) comprising a plate (31) substantially perpendicular to the axis (X-X') and attached to the end shield (11), and blades (32) protruding from the plate (31);
the plate (31) having a sealing part (311) axially sealing at least one of the peripheral spaces (13);
the plate (31) of the fan (30) comprising a substantially annular solid part (312) having a radially outer edge;
the sealing part (311) comprising an axial relief (314) in the form of a thin tab comprising a first face (315) axially inclined from the solid part (312) of the plate (31) at the side of the claws (12) and from the axis of rotation (X-X') so that the first face (315) extending obliquely between the solid part (312) and the axis of rotation (X-X');
the tab further comprising a second face (316) extending from a distal end of the first face (315) parallel to the axis (X-X');
the axial relief (314) extending from the plate (31) between the claws (12);
the claws (12) having radially outer surfaces (123) defining a diameter of the rotor assembly;
the second face (316) of the tab (314) lying in the extension of the outer faces (123) of two claws (12) and partially sealing the space separating these two outer faces over a short axial length;
the solid part (312) is provided with recessed zones (318) hollowed radially inwardly from the radially outer edge of the solid part (312), each of the recessed zones (318) being delimited by a base and two lateral sides diverging from the base up to the radially outer edge of the solid part (312);
the sealing part (311) extending from the base of the recessed zone (318).

2. The rotor assembly according to claim 1, wherein a central web (319) extends axially parallel to the axis of rotation (X-X') from the base of the of the recessed zone (318); wherein two lateral webs link opposite lateral edges of the central web (319) to the lateral edges of the first and second faces (315, 316) of the tab (314), and wherein the central web (319) is narrower than the first and second faces (315, 316) of the tab (314) such that the lateral webs diverge from the central web to the first and second faces (315, 316).

3. The rotor assembly according to claim 1, wherein the fan (30) is moulded and comprises a blade (32) extending along the first face (315) of the tab (314).

4. Alternator or alternator-starter for an automobile vehicle, comprising a rotor assembly according to claim 1.

5. The rotor assembly according to claim 1, wherein the first face (315) of the tab (314) extends obliquely from the solid part (312) axially and radially outwardly and obliquely from the axis of rotation (X-X').

6. The rotor assembly according to claim 1, wherein the first face (315) of the tab (314) has concave curvature turned towards the axis of rotation (X-X').

7. A rotor assembly mounted to rotate around an axis of rotation (X-X') and comprising:
two magnet wheels (10) separated by an axial spacing and arranged opposite each other, each of the wheels (10) comprising an end shield (11) substantially perpendicular to the axis (X-X') and claws (12) extending axially from the end shield (11) towards the other wheel (10);
the end shield (11) of one of the magnet wheels comprising an axial face (111) opposite the other wheel;
the claws (12) of one wheel (10) being attached to the end shield (11) by respective bases (121) mutually separated by peripheral spaces (13); and
a fan (30) positioned on the axial face (111) of the end shield (11) of one of the wheels (10) opposite the other wheel (10) so as to axially seal at least partly one of the peripheral spaces (13);
the fan (30) comprising a plate (31) substantially perpendicular to the axis (X-X') and attached to the end shield (11), and blades (32) protruding from the plate (31);
the plate (31) having a sealing part (311) axially sealing at least one of the peripheral spaces (13);
the plate (31) of the fan (30) comprising a substantially annular solid part (312) having a radially outer edge;
the sealing part (311) comprising an axial relief (314) in the form of a thin tab comprising a first face (315) axially inclined from the solid part (312) of the plate (31) at the side of the claws (12) and from the axis of rotation (X-X') so that the first face (315) extending obliquely between the solid part (312) and the axis of rotation (X-X');
the tab further comprising a second face (316) extending from a distal end of the first face (315) parallel to the axis (X-X');
the axial relief (314) extending from the plate (31) between the claws (12);
the axial relief (314) being shaped so as to serve as a fixing clip for the fan (30) on the corresponding magnet wheel (10);
the solid part (312) is provided with recessed zones (318) hollowed radially inwardly from the radially outer edge of the solid part (312), each of the recessed zones (318) being delimited by a base and two lateral sides diverging from the base up to the radially outer edge of the solid part (312);
the sealing part (311) extending from the base of the recessed zone (318).

8. A rotor assembly mounted to rotate around an axis of rotation (X-X') and comprising:
two magnet wheels (10) separated by an axial spacing and arranged opposite each other, each of the wheels (10) comprising an end shield (11) substantially perpendicular to the axis (X-X') and claws (12) extending axially from the end shield (11) towards the other wheel (10);
the end shield (11) of one of the magnet wheels comprising an axial face (111) opposite the other wheel;
the claws (12) of one wheel (10) being attached to the end shield (11) by respective bases (121) mutually separated by peripheral spaces (13); and
a fan (30) positioned on the axial face (111) of the end shield (11) of one of the wheels (10) opposite the other wheel (10) so as to axially seal at least partly one of the peripheral spaces (13);
the fan (30) comprising a plate (31) substantially perpendicular to the axis (X-X') and attached to the end shield (11), and blades (32) protruding from the plate (31);
the plate (31) having a sealing part (311) axially sealing at least one of the peripheral spaces (13);
the plate (31) of the fan (30) comprising a substantially annular solid part (312) having a radially outer edge;
the sealing part (311) comprising an axial relief (314) in the form of a thin tab comprising a first face (315) axially inclined from the solid part (312) of the plate (31) at the side of the claws (12) and from the axis of rotation (X-X') so that the first face (315) extending obliquely between the solid part (312) and the axis of rotation (X-X');
the tab further comprising a second face (316) extending from a distal end of the first face (315) parallel to the axis (X-X');

the axial relief (314) extending from the plate (31) between the claws (12);

the tab (314) carrying an axial reinforcing rib (317) extending from the plate (31) along the first and second faces (315, 316) of the tab (314), the reinforcing rib (317) being centrally located relative to the first and second faces (315, 316);

the solid part (312) is provided with recessed zones (318) hollowed radially inwardly from the radially outer edge of the solid part (312), each of the recessed zones (318) being delimited by a base and two lateral sides diverging from the base up to the radially outer edge of the solid part (312);

the sealing part (311) extending from the base of the recessed zone (318).

\* \* \* \* \*